Oct. 17, 1950     F. A. ROBERTS     2,526,422
SELECTIVE DISPENSING CABINET

Filed Oct. 11, 1946     2 Sheets-Sheet 1

INVENTOR:
FRANK A. ROBERTS
O. O. Martin
ATTORNEY

Oct. 17, 1950  F. A. ROBERTS  2,526,422
SELECTIVE DISPENSING CABINET
Filed Oct. 11, 1946  2 Sheets-Sheet 2
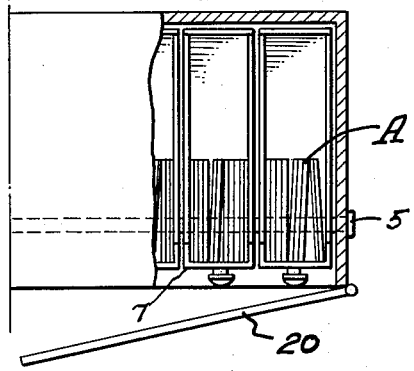
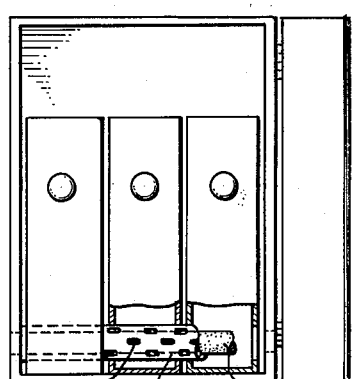
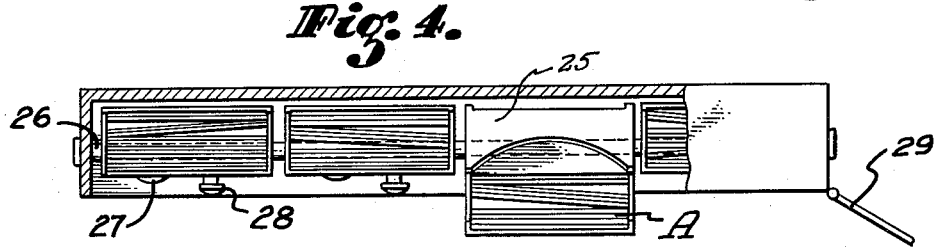
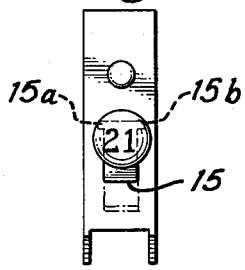
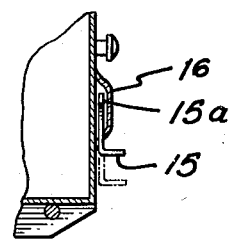
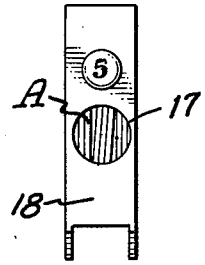
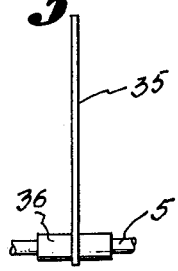
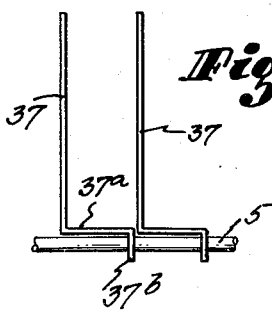
INVENTOR:
FRANK A. ROBERTS
O. Martin
ATTORNEY Patented Oct. 17, 1950

2,526,422

UNITED STATES PATENT OFFICE 2,526,422

SELECTIVE DISPENSING CABINET

Frank A. Roberts, Long Beach, Calif.

Application October 11, 1946, Serial No. 702,689

3 Claims. (Cl. 312—31)

This invention relates to a storage and dispensing cabinet for articles of uniform or irregular shapes and sizes and refers particularly to a device from which such articles may conveniently be selectively dispensed.

It is the general object of my invention to provide a simple, compact and inexpensive cabinet capable of holding large supplies of articles. Another object is to provide a device within which articles of irregular size may be held stored without being subjected to pressure or having freedom of uncontrolled movement.

Further objects and the advantageous features of the invention will appear upon perusal of the following detailed description and by referring to the accompanying drawings, of which:

Fig. 3 is a plan view of one end of the device;

Fig. 4 is a plan view of a modified form of cabinet.

Fig. 5 is a front view of a modified form of receptacle;

Fig. 6 is a fragmentary side view of the receptacle of Fig. 5;

Fig. 7 is a front view showing a further modification of the receptacle;

Fig. 9 is a front view of the device of Fig. 8; and

Figs. 10 and 11 illustrate spacing elements mountable within the device of the invention.

Figure 1:
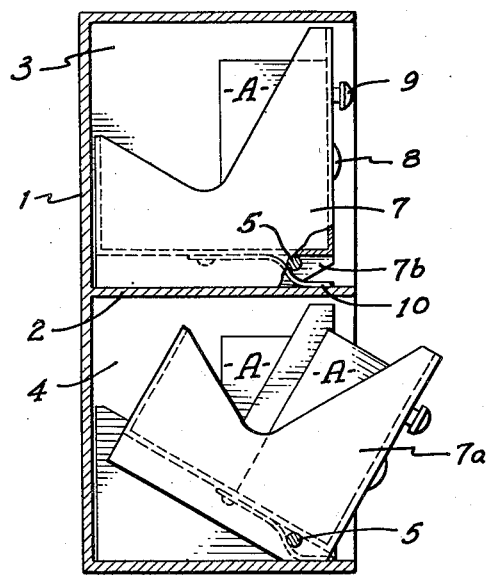
Fig. 1 is a side elevational view of a device embodying the invention and with the front portion of the casing thereof broken away for the sake of clearness.
Figure 2:
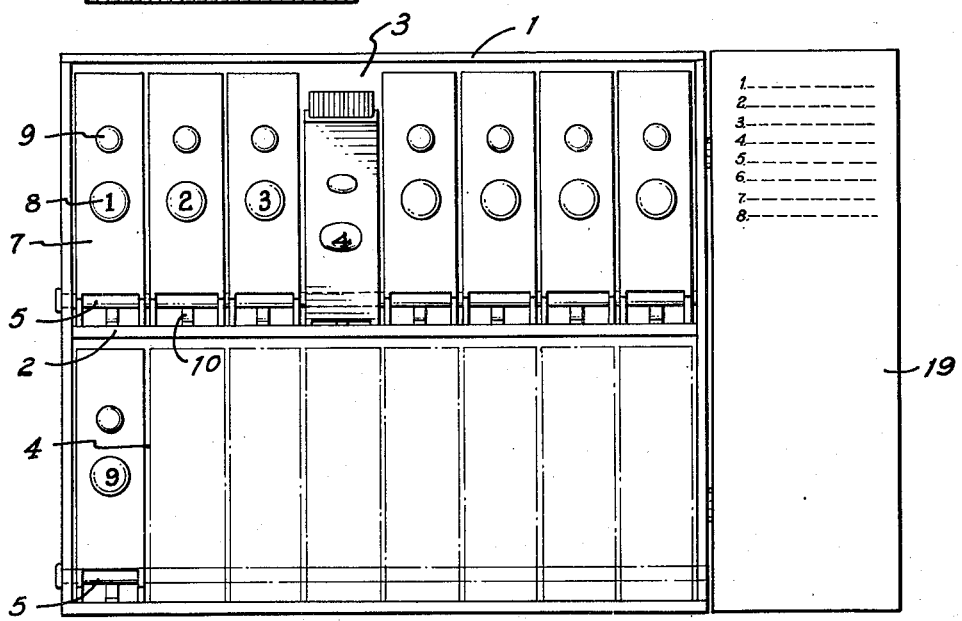
Fig. 2 is a substantially corresponding front view of the device.

The structure of my invention in the form illustrated in Figs. 1 to 3, comprises a rectangular casing 1 which, by a partition 2, is divided into upper and lower compartments 3 and 4. In each of these compartments, near the front, bottom corners thereof, is mounted a hinge rod 5. These rods serve to support two rows of article receptacles, or bins 7. Each of these bins is perforated near the front, bottom corner thereof to receive the rod 5. The bottom surface of each bin is, beginning at a point directly below the rod 5, shown upwardly slanting, as at 7$^b$, in order to provide sufficient clearance for movement of the bin into the forwardly tilted position shown at 7$^a$, in Fig. 1.

Each bin provides storage room for a number of articles such as labels and it is, on the front surface thereof, fitted with an index plate 8 to denote the type of labels stored therein. When presented in this form, the cabinet of the invention is particularly adapted for storing and dispensing medicine labels A and so is ideally suited for use by pharmacists.

In order to facilitate the opening movement of the bins, I have provided on each bin a finger piece of knob 9 and this knob may be positioned in any desired position along the front surface thereof. When it is again desired to close the bin, it is merely required lightly to push the bin inwardly to start this movement. This pivotal axis 5 is so arranged that the center of gravity of the closed bin is well back of this axis and that, for this reason, the bin will automatically return to closed position once the closing movement has been initiated. The bin will, for the same reason, also tend to remain in closed position.

Should it, however, be found desirable to provide additional means for urging the bin into closed position, it is merely required to mount a resilient element, such as a light spring 10, on the bottom surface of the bin. This spring may also, if preferred, be made powerful enough to return the bin to closed position the moment the operator lets go of it.

One objection to label cabinets, such as have come to my notice, is the difficulty of checking the contents thereof for the purpose of enabling the user thereof quickly to determine when it is time to order new supplies of labels, without having to open each bin. This may be done by placing an indicator on each bin, and such indicators may take the form of a tab 15 which is mounted to slide within the index plate 16. When the contents of the bin reaches a predetermined minimum, it is merely required to pull this tab out until stopped by its ears 15$^a$, 15$^b$. The operator is then in position, by a mere glance at the bins, to determine which labels to reorder.

Another simple means of checking the contents of the bins is, in Fig. 7, shown in the form of a window 17, fitted into the front surface of the bin 18. A mere glance through this window will furnish the user the required information.

It was above stated that the bins are fitted with number plates 8 to designate the kind of labels stored therein. It is, of course, necessary to provide, in connection with these number indicators any identifying index, and such index may conveniently be mounted directly on the cabinet. Illustrative thereof, I have in Fig. 2 shown a plate or flap 19 pivotally hung on one front corner of the cabinet, and a table of contents is glued or otherwise mounted on this plate.

Where it is desired to provide a closure for the cabinet, it is merely required to widen the flap 19 sufficiently to cover the entire front surface of the cabinet. Or, if preferred, a two-leaf door 20 may be substituted, one-half of which is indicated in Fig. 3.

In some cases, it may be found preferable to mount the bins sidewise within the cabinet instead of edgewise as above described, and such arrangement is indicated in Fig. 4. The bins 25 are, in this case, similarly mounted to tilt on a pivot rod 26 and they are fitted with number plates 27 and knobs 28 as in the first described cabinet. The index flap 29 may also remain as above described.

Figure 8:
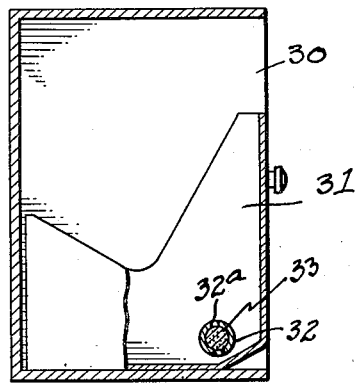
Fig. 8 is a side elevational sectional view of a modified form of casing and receptacle mounted therein.

The device of the invention as above described is particularly adapted to hold large quantities of labels or other similar articles. I have found, however, that the device is ideally suited for the purpose of maintaining stored therein other types of articles. It may, for example, form a valuable addition to the office desk, as a convenient means for storing small articles such as pen points, erasers and the like. It may also be modified to form a spice cabinet in the kitchen. It will be found useful, as well as ornamental, on the desk or living room table as a cabinet for cigarettes and such modified device as illustrated in Fig. 8 to consist of a single compartment casing 30 within which a receptacle 31 is hung on a pivot 32 substantially in the manner above described. This pivot is made tubular in shape and it is noticed that it is placed within the receptacle and not below the bottom thereof as in the case of the above described device. A wick 33 is placed within this tubular pivot and a series of perforations 32ᵃ are cut through the wall thereof. When this wick is saturated with a suitable liquid, it is found that it serves as a humidifying element to maintain the cigarettes therein properly moistened. If, in addition, an odoriferous substance is added to the liquid with which the wick is saturated, it is found that the cigarettes may be permeated with the kind of perfume or scent preferred by the person using the device.

In the illustration of Fig. 8, the spring 10 has been omitted, but I wish it understood that such spring may be added if desired. It should also be understood that, while I have only shown a single compartment casing in Fig. 8, two or more compartments may be employed if preferred.

As shown in Figs. 10 and 11, it is possible in order to save space and also for the purpose of varying the storage space within the receptacles entirely to remove the bins and in their place to mount partitions on the pivot rod 5 such partitions may take the form of a blade 35 which is secured to a sleeve 36 and the latter may be moved axially on the pivot rod 5 to increase or decrease the distance to the adjacent partitions within the casing. If preferred the partitions may be constructed as indicated in Fig. 11 in which a plate 37 is bent to form a bottom surface 37ᵃ for the articles to rest on, and a lip 37ᵇ is bent downward and perforated to admit the pivot 5. The elements of Figs. 10 and 11 are merely illustrative of means for modifying the width of the receptacles to suit the kind of articles to be held stored therein.

While I have above described a preferred form of my invention, it is not my desire to be limited to the exact shapes, proportions and arrangements shown and described, but I reserve the right to embody further modifications, within the scope of the claims hereto appended, to the end that the cabinet may be employed for storage and selective dispensing of a great variety of articles.

I claim:

1. An article supporting and dispensing device comprising, an open-front cabinet, a tubular pivot rod transversely extending through said cabinet at the bottom of and near the open-front of the cabinet, a series of article supporting bins hung on said rod entirely within the cabinet for limited swinging movement out of the cabinet to expose articles held therein for withdrawal therefrom, the tubular rod extending through the bins above the bottom thereof, and a wick within said tubular rod, said rod having a multiplicity of perforations through the wall thereof.

2. An article supporting and dispensing device comprising, an open-front cabinet, a tubular pivot transversely extending through said cabinet and having a multiplicity of perforations through the wall thereof, a moisture saturated wick within said pivot, a series of article supporting bins hung on the pivot for limited swinging movement out of the cabinet to expose articles stored therein for withdrawal therefrom, the tubular rod extending through the bins above the bottom thereof, and a handle on each bin for manual operation thereof.

3. An article supporting a dispensing device comprising, an open-front cabinet, a tubular pivot transversely extending through the cabinet at the bottom and near the open-front thereof, said tubular pivot having a multiplicity of perforations through the wall thereof, a series of article supporting bins hung on said pivot for limited swinging movement out of the cabinet to expose articles held therein for withdrawal therefrom, the tubular rod extending through the bins above the bottom thereof, a moisture saturated wick within said tubular pivot, and a hinged door for closing the open-front of the cabinet.

FRANK A. ROBERTS.

REFERENCES CITED

The following references are of record in the file of this patent:

UNITED STATES PATENTS

| Number | Name | Date |
|---|---|---|
| 269,346 | Stoffel | Dec. 19, 1882 |
| 894,892 | Langfeld | Aug. 4, 1908 |
| 1,009,977 | Kirkaldie | Nov. 28, 1911 |
| 1,094,324 | Goebel | Apr. 21, 1914 |
| 1,807,804 | Stone | June 2, 1931 |
| 2,051,777 | Purinton | Aug. 18, 1936 |
| 2,347,892 | Derman | May 2, 1944 |

FOREIGN PATENTS

| Number | Country | Date |
|---|---|---|
| 414,158 | Great Britain | Aug. 2, 1934 |